United States Patent [19]

Fohl

[11] 4,204,834
[45] May 27, 1980

[54] LEADLESS ELECTRIC FLASH LAMP

[75] Inventor: Timothy Fohl, Carlisle, Mass.

[73] Assignee: GTE Sylvania Incorporated, Stamford, Conn.

[21] Appl. No.: 873,258

[22] Filed: Jan. 30, 1978

[51] Int. Cl.² ............................................... F21K 5/02
[52] U.S. Cl. ..................................... 431/362; 431/358
[58] Field of Search ............................... 431/357–360; 313/481

[56] References Cited

U.S. PATENT DOCUMENTS

| 3,897,196 | 7/1975 | Saunders et al. | 431/358 |
| 3,941,555 | 3/1976 | Anderson et al. | 431/358 |
| 3,959,860 | 6/1976 | Schindler | 431/358 |
| 4,143,294 | 3/1979 | Miller et al. | 313/481 |

Primary Examiner—Samuel Scott
Assistant Examiner—Wesley S. Ratliff, Jr.
Attorney, Agent, or Firm—Lawrence R. Fraley

[57] ABSTRACT

A flash lamp which is electrically activated using capacitive coupling between a pair of conductors located externally of the lamp's glass envelope and a respective pair of conductors located within the envelope. A quantity of primer material, also located within the envelope, serves to ignite the flash lamp's combustible material (e.g. shredded zirconium). The primer material is electrically joined to the internal conductors through either a pair of spring contacts or the shredded combustible material.

17 Claims, 2 Drawing Figures

LEADLESS ELECTRIC FLASH LAMP

CROSS REFERENCE TO CO-PENDING APPLICATION

An application entitled "Leadless Electric FLash Lamp Assembly" (Inventor: T. Fohl) was filed Jan. 30, 1978 and listed in the Patent and Trademark Office under Ser. No. 873,378. Ser. No. 873,378, now U.S. Pat. No. 4,135,227, is assigned to the same assignee as the instant application and defines a flash lamp assembly for use with a camera and which utilizes the leadless flash lamps of the present invention.

An application entitled "Single Lead Electrically Activated Flash Lamp" (Inventors: P. B. Newell et al) was also filed Jan. 30, 1978 and assigned to the same assignee as the present invention. This application is listed under Ser. No. 873,250, now U.S. Pat. No. 4,174,944 and defines a single lead flash lamp which has an external conductive layer capacitively coupled to the lamp's filamentary material.

Still another application was filed Jan. 30, 1978 and listed under Ser. No. 873,376, now U.S. Pat. No. 4,158,878, entitled "Improved Means For Electrically Contacting Flash Lamp Having External Conductive Coating" (Inventors: P. B. Newell et al), defines several means for electrically contacting the conductive coatings located on the flash lamps such as described in this application and the above application Ser. No. 873,250. Ser. No. 873,376 is now U.S. Pat. No. 4,158,878.

BACKGROUND OF THE INVENTION

The invention relates to flash lamps and particularly to flash lamps which are electrically activated.

Electrically-activated flash lamps as used in many photographic applications are well known in the art with examples described in U.S. Pat. Nos. 3,959,860 (Schindler), 3,941,555 (Anderson et al), and 3,897,196 (Saunders et al). Such flash lamps typically include a glass envelope having a combustion-supporting atmosphere (e.g. oxygen) therein established at a pressure of several (e.g. 5-10) atmospheres. A pair of spaced apart metallic leads are sealed within one end of the lamp and project within the envelope to provide the necessary electrical current path to the lamp's primer material. When activated, the primer ignites a quantity of combustible material (e.g. zirconium) to produce the required highly intense flash of light. In electrically-activated flash lamps of the low-voltage variety, a filament is used to bridge the projecting ends of the metallic leads, while in high-voltage flash lamps (those requiring hundreds or thousands of volts at low energy to achieve ignition), a quantity of primer material may serve as the bridge. Primer may also be applied to the aforedescribed filament in low-voltage type lamps.

As stated, flash lamps of the varieties described above typically include a pair of metallic leads which project through the lamp's glass envelope. There are several disadvantages to this requirement, including the following:

1. Sealing of the leads into the envelope is a costly production step due primarily to the high cost of equipment required to accomplish this step;

2. Use of metallic leads limits the types of glasses which can be satisfactorily used as the envelope component due to the stringent requirement to mate glass and leads having similar expansion characteristics;

3. The electrical leads must establish sound, direct contact with the respective electrical firing circuit. This requires an additional manufacturing step as well as extra material. Such a requirement also restricts the design possibilities for multi-lamp units; and 4. The amount of space and glass necessary to properly seal the metallic leads poses a serious limitation to the designing of small flash lamps.

From the above disadvantages, it is understood that an electrically-activated flash lamp which does not require metallic leads within the lamp's glass envelope would constitute a significant advancement in the art.

OBJECTS AND SUMMARY OF THE INVENTION

It is therefore a primary object of the present invention to provide a leadless flash lamp which is capable of being activated electrically.

In accordance with one aspect of the invention, there is described a flash lamp having a light-transmitting envelope, a quantity of filamentary combustible material and a combustion-supporting atmosphere within the envelope, and a quantity of primer material also within the envelope for igniting the combustible material. Activation of the flash lamp is accomplished electrically through capacitive coupling between a pair of conductive means located externally of the envelope and a corresponding pair of electrical conductors positioned within the envelope.

DETAILED DESCRIPTION OF THE PREFERRED EMBODIMENTS

For a better understanding of the present invention together with other and further objects, advantages and capabilities thereof, reference is made to the following disclosure and appended claims in connection with the above-described drawings.

Figure 1:
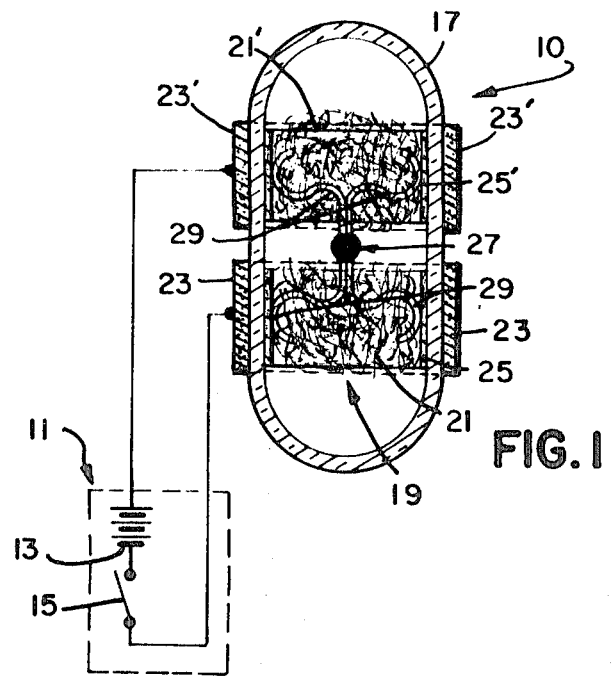
FIGS. 1 and 2 are elevational views, in section, of leadless flash lamps in accordance with preferred embodiments of the invention.

In FIG. 1 there is shown a flash lamp 10 which is adapted for being electrically-activated by electrical current from a circuit 11 which may be found in many cameras. Such a circuit typically includes a suitable power source 13 and a switch 15 for opening and closing circuit 11. The preferred power source used in many of today's cameras is a piezoelectric crystal which depends on some form of mechanical striking for its actuation. The crystal, being a high voltage source, provides the needed current to the flash lamp as a result of said striking. If such a member is used in circuit 11, closing of switch 15 would cause a hammer or similar component to impact upon the crystal and effect actuation thereof. A crystal typically provides 1000–3000 volts.

Flash lamp 10 comprises a hermetically-sealed envelope 17 of light-transmitting material (e.g. glass) which includes a combustion-supporting atmosphere (e.g. oxygen) therein. This atmosphere established at a pressure of about five to ten atmospheres. The internal volume of envelope 17 is preferably about two cubic inches. A quantity of filamentary combustible material 19 is located within the envelope and is divided into two approximately equal portions 21 and 21' which are spaced apart from each other. Material 19 is preferably shredded zirconium or hafnium.

Flash lamp 10 further comprises first and second spacedly positioned electrically conductive means 23 and 23' which are located externally of envelope 17. In the embodiment of FIG. 1, means 23 and 23' each comprise a layer of transparent conductive material in the form of a thin coating about the envelope's external surface. The preferred materials for means 23 and 23' are tin oxide and indium oxide.

Located on the internal surface of envelope 17 are first and second spacedly-oriented electrical conductors 25 and 25' which are also preferably thin coatings of either tin oxide or indium oxide. These coatings, also transparent, are located opposite the respective external coatings for conductive means 23 and 23'. Means 23 and 23' are therefore positioned in a capacitively coupled relationship to conductors 25 and 25', respectively, and receive electrical current therefrom via this method (capacitive discharge) through the wall of envelope 17. Each of the coatings of means 23 and 23' is connected to circuit 11 in the manner shown.

The coatings for means 23 and 23' and conductors 25 and 25' are of a thickness such that each has a surface resistance within the range of from about 100 to about 50,000 ohms per square. In accordance with these parameters, the dielectric constant of the wall of envelope 17 is within the range of about 4 to about 15.

Also located within envelope 17 is means 27 for igniting portions 21 and 21' of combustible material 19. Means 27 comprises a quantity of primer material which in one example was a mixture of combustible metal powder, e.g. zirconium, one or more metal oxides, e.g. cobalt or tungsten, and a binding agent such as nitrocellulose. Primer 27 is electrically joined to each of the conductors 25 and 25' by at least one resilient contact member 29. As shown, two members 29 are preferably used for each conductor 25 and 25' to assure a spaced relationship between primer 27 and the internal walls of envelope 17. In other words, primer 27 is preferably centrally located within envelope 17 to facilitate ignition of combustible material 19. Each member 29 comprises a spring contact having a thickness of approximately 0.02 inches. In the event that flash lamp 10 includes a protective insulative coating thereon, portions of this coating would be removed to permit the desired electrical connections to coatings 23 and 23'. A well known material suitable as a protective coating is cellulose acetate.

Figure 2:
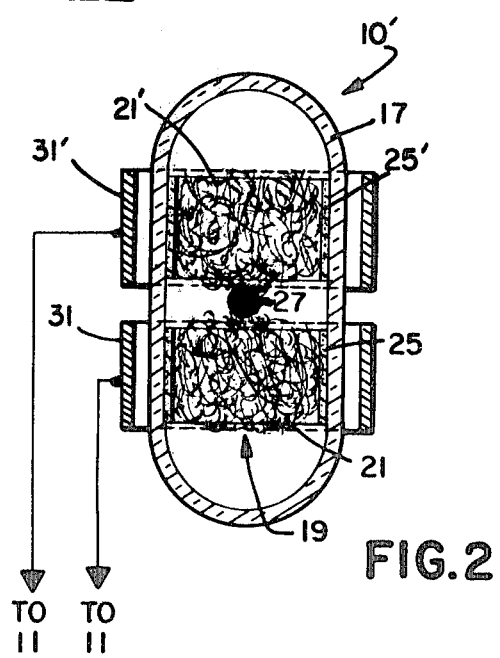

In the embodiment of FIG. 2, flash lamp 10' comprises the aforedescribed envelope 17, combustible material 19, internally located electrical conductors 25 and 25', and primer material 27. In this embodiment, however, the external conductive means comprise a pair of reflectors 31 and 31' which are positioned about a portion of envelope 17 at a spaced distance (e.g. 0.10 inches) from the external surface thereof. Accordingly, the reflectors and circuit 11 comprise a reflective assembly in which lamp 10' may be utilized. Reflectors 31 and 31' may be semicircular in shape such as shown in FIG. 2 to thereby reflect the lamp's highly intense output in substantially one direction. In the embodiment of FIG. 2, this direction would be approximately perpendicular to the drawing or, in other words, into the eyes of the drawing's viewer. Each reflector has a thickness of about 0.020 inches and is comprised of metallized plastic. Each is also electrically connected to the respective circuit 11 in the same manner as means 23 and 23' in FIG. 1. The embodiment of FIG. 2 is also highly versatile for present photographic applications in that lamp 10' can be used in conjunction with many current reflector designs, provided the reflectors can be sectioned and connected electrically to the designated power source. Understandably, such modifications are relatively easy to accomplish and may be done at little cost to the manufacturer.

In the embodiment of FIG. 2, combustible material 19 is formed in a configuration which provides direct contact and support to primer 27. Material 19 is also divided into the approximately equal sized portions 21 and 21' as shown in FIG. 1. Portions 21 and 21', being electrically conductive, thus assure a positive connection to the internal coatings 25 and 25', respectively.

Thus there has been shown and described an electrically-activated flash lamp which is triggered using capacitive coupling. As such, the lamp eliminates the prior art requirement for use of metallic leads which penetrate the lamp's envelope to assure the needed electrical connections.

While there have been shown and described what are at present considered the preferred embodiments of the invention, it will be obvious to those skilled in the art that various changes and modifications may be made therein without departing from the scope of the invention as defined by the appended claims.

What is claimed is:

1. An electrically-activated flash lamp for use within a reflective assembly having first and second spaced-apart electrically conductive reflector members, said flash lamp comprising:
   a hermetically-sealed, light-transmitting envelope including a combustion-supporting atmosphere therein;
   a quantity of filamentary combustible material within said envelope;
   first and second spaced-apart electrical conductors positioned on the internal surface of said envelope, said first and second electrical conductors adapted for being capacitively coupled to said first and second conductive reflector members, respectively, through the wall of said envelope; and
   a quantity of primer material within said envelope for igniting said filamentary combustible material, said primer material electrically connected to said first and second internally positioned electrical conductors.

2. The flash lamp according to claim 1 wherein said light-transmitting envelope is comprised of glass.

3. The flash lamp according to claim 1 wherein said conductive reflector members are spacedly positioned from the external surface of said envelope.

4. The flash lamp according to claim 1 wherein each of said internally positioned electrical conductors comprises a transparent coating.

5. The flash lamp according to claim 4 wherein each of said coatings is of a material selected from the group consisting of tin oxide and indium oxide.

6. The flash lamp according to claim 1 including first and second resilient contact members electrically connected to said first and second internally positioned electrical conductors, respectively, said primer material electrically connected to said contact members.

7. The flash lamp according to claim 6 wherein each of said resilient contact members is a spring.

8. The flash lamp according to claim 1 wherein said primer material is electrically connected to said filamentary combustible material and said combustible material is electrically joined to said first and second internally positioned electrical conductors.

9. An electrically-activated flash lamp comprising:
a hermetically-sealed, light-transmitting envelope including a combustion-supporting atmosphere therein;
a quantity of filamentary combustible material within said envelope;
first and second spaced-apart electrically conductive means positioned on the external surface of said envelope;
first and second spaced-apart electrical conductors positioned on the internal surface of said envelope in capacitively coupled relationship to said first and second externally positioned electrical conductive means, respectively, said capacitive coupling occurring through the wall of said envelope; and
a quantity of primer material within said envelope for igniting said filamentary combustible material, said primer material electrically connected to said first and second internally positioned electrical conductors.

10. The flash lamp according to claim 9 wherein said light-transmitting envelope is comprised of glass.

11. The flash lamp according to claim 9 wherein each of said first and second externally positioned conductive means comprises a transparent coating.

12. The flash lamp according to claim 11 wherein each of said coatings of said conductive means is a material selected from the group consisting of tin oxide and indium oxide.

13. The flash lamp according to claim 9 wherein each of said first and second internally positioned electrical conductors comprises a transparent coating.

14. The flash lamp according to claim 13 wherein each of said coatings of said conductors is a material selected from the group consisting of tin oxide and indium oxide.

15. The flash lamp according to claim 9 including first and second resilient contact members electrically connected to first and second internally positioned electrical conductors, respectively, said primer material electrically connected to said contact members.

16. The flash lamp according to claim 15 wherein each of said resilient contact members is a spring.

17. The flash lamp according to claim 9 wherein said primer material is electrically connected to said filamentary combustible material and said combustible material is electrically joined to said first and second externally positioned electrical conductive means.

* * * * *